(12) United States Patent
Kuo et al.

(10) Patent No.: US 6,940,667 B2
(45) Date of Patent: Sep. 6, 2005

(54) REDUNDANT SERVO PATTERN STAMPER

(75) Inventors: David S. Kuo, Palo Alto, CA (US); Shih-Fu Lee, Fremont, CA (US); Neil N. Deeman, Alamo, CA (US)

(73) Assignee: Seagate Technology LLC, Scotts Valley, CA (US)

(*) Notice: Subject to any disclaimer, the term of this patent is extended or adjusted under 35 U.S.C. 154(b) by 357 days.

(21) Appl. No.: 10/340,096

(22) Filed: Jan. 10, 2003

(65) Prior Publication Data

US 2004/0001266 A1 Jan. 1, 2004

Related U.S. Application Data

(60) Provisional application No. 60/392,787, filed on Jun. 28, 2002.

(51) Int. Cl.$^7$ ................................................. G11B 5/86
(52) U.S. Cl. .............................. 360/16; 360/15; 360/17; 369/13.01; 369/14
(58) Field of Search .......................... 360/15–17, 77.08, 360/77.03, 77.05, 55, 57, 59, 66, 135, 78.04; 369/13.01, 14

(56) References Cited

U.S. PATENT DOCUMENTS 6,304,407 B1 * 10/2001 Baker et al. .................. 360/75
6,359,747 B1 * 3/2002 Kuo ............................. 360/75
6,643,082 B1 * 11/2003 Belser .......................... 360/48
6,757,116 B1 * 6/2004 Curtiss et al. ................ 360/15
6,813,105 B2 * 11/2004 Takano ......................... 360/17

FOREIGN PATENT DOCUMENTS

| EP | 1073043 | 1/2001 |
| JP | 63032772 | 2/1988 |
| JP | 10027443 | 1/1998 |

* cited by examiner

*Primary Examiner*—David Hudspeth
*Assistant Examiner*—Natalia Figueroa

(57) ABSTRACT

A plurality of redundant sets of servo data are recorded on a magnetic hard disk. The set meeting a predetermine criteria is employed when the hard disk is assembled into a hard disk drive. The determination of which set has the criteria may be conducted by the disk drive itself. The criteria may include a determination the set of servo data having meeting a minimum quality criteria or the fewest errors. The criteria may include a selection of a set of servo data having a specific pattern where the prerecorded sets may comprise a differing servo patterns that may be used by disk drives requiring specific servo patterns. The servo data are printed onto the hard disk by means of a stamper or mask having all the sets of servo data.

15 Claims, 4 Drawing Sheets

REDUNDANT SERVO PATTERN STAMPER

CROSS-REFERENCE TO RELATED APPLICATIONS

This application claims benefit of U.S. provisional patent application Ser. No. 60/392,787, filed on Jun. 28, 2002, which is hereby incorporated by reference.

BACKGROUND OF THE INVENTION

1. Field of the Invention

The invention relates to the field of disk drives and more particularly to methods for writing servo tracks on magnetic hard disks.

2. Description of Related Art

Hard disk drives provide prerecorded tracking servo information on the data recording surfaces of their magnetic hard disks. This servo information typically comprises servo bursts spaced evenly along tracks. Data is recorded between the servo bursts. In most cases, servo bursts are approximately radially aligned, describing a small arc from the disk's ID to its OD. This radial alignment makes them look like arced spokes of the wheel. They are made to form and arc because the servo data is read by a rotary actuator that describes the same arc as it the traverses between a disk's ID and its OD.

FIG. 1 illustrates a disk 10 having a number of servo data spokes 12. While there are eight illustrated in the figure, a disk drive will typically have hundreds of such servo data spokes spaced it even angles around disk. In many disk drives today, the servo data takes up approximately 3 to 11 percent of the total disk drive recording surface.

The servo bursts may be written onto a disk's surface using a variety of techniques. The most common method is to write the servo onto the disk using the disk drive's own magnetic head controlled typically by an externally introduced picker that grasps the drive's rotary actuator arm upon which the read/write head is mounted. An external mechanism incrementally moves the arm while other circuits command the disk drive to write the servo bursts.

Another common servo-writing method comprises writing servo bursts onto the disks already assembled onto the disk drive spindle but prior to the disk drive spindle/disk combination, also known as a hub/disk assembly ("HDA"), being assembled into the disk drive itself.

A newer approach employs a stamper to "print" the servo patterns on the disk using a high permeability stamper, as illustrated in FIG. 2, to impose a pattern on media. As illustrated in the top leftmost portion of the figure, the disk is first DC erased. For example, an externally applied field 13, the large arrows H in the figure, causes all the magnetic domains 14 of the media to switch in an uniform direction as illustrated. Next, a high permeability stamper 16, having a desired pattern composed of raised bosses 17, is pressed against the disk 10. An externally applied field of opposite polarity 18 illustrated by the now downward arrows 18, is now applied to the disk through the stamper 16. This causes the disk areas in contact with the stamper 16 to switch their magnetic direction to be aligned with the externally applied field. The areas not in contact with the stamper are shielded by the stamper. The shielded areas do not change their magnetic orientation. This causes the disk to assume a reversed magnetic orientation 15 in the pattern of the bosses 17 of the stamper 16.

While FIG. 2 illustrates vertically oriented magnetic domains 14 and 15 which are useful in perpendicular recording, the same technique may be employed using horizontally oriented magnetic fields to encode horizontally oriented magnetic domains.

The stamper 16 appears identical to FIG. 1 when viewed from a plan view. In other words, the stamper 16 would encode the images of the servo bursts radially aligned in arced spokes as illustrated in FIG. 1.

A problem that occurs in writing servo onto a disk regardless of the technique used is that the disk drives can tolerate only so much servo error before the servo must be rewritten or the disk scrapped. Most drives cannot, for example, tolerate two bad servo bursts in a row.

Today's disk drive manufacturing processes, therefore, typically check the quality of servo data recording immediately after data is written. This is preferably done after the disks are mounted in the production disk drive. However, the quality of the servo data recording may also be tested by spinstand using special test equipment.

When a stamper is used to print servo data onto a disk, the disk is not yet assembled onto the disk drives own spindle. If a servo rewrite becomes necessary, the disk must be remounted on the stamper apparatus. For this reason, disks made using stampers are typically tested on a spinstand.

It remains desirable however to both test the quality of servo data in the disk drive itself and to avoid rewriting the servo data if there are too many errors.

Another problem in the manufacture of magnetic disks is that different disk drives require different servo data patterns. When stampers are used to print the servo data onto the hard disk, a different stamper is required for each different kind of servo data pattern. This is undesirable from a cost perspective as stampers can be very expensive.

SUMMARY OF THE INVENTION

The invention comprises recording a plurality of redundant sets of servo data on a magnetic hard disk. Each set may then be tested in sequence until a set meeting predetermine criteria, such as a minimum quality standard, is determined. Alternatively, a predetermine number of the sets, which may be all of them, may be tested and the set having greatest quality, i.e., the fewest errors is selected. The servo data set that has been determined to meet the required criteria level is then employed as the set of servo data when the hard disk is assembled into a hard disk drive.

One of sets may comprise a pattern different from the other sets so that the hard disk may be used by disk drives requiring differing servo patterns. The criteria would then include selection of a subset of the servo data sets that match the requested servo data pattern.

The servo data may be printed onto the hard disk by means of a stamper or mask. The servo data may then tested in the disk drive. When proper servo-data set is determined, it used and the rest are ignored. When data is recorded by the disk drive, the redundant servo data sets are overwritten.

The servo data may also be tested on a spinstand. After determining a set of servo data to use according to a defined set of criteria, which may include a selection of pattern and quality, the other sets of servo data may be erased or the set that is to be used marked by the tester apparatus.

The set of servo data selected may also be marked in a manner readable by the disk drive or spinstand test equipment.

DETAILED DESCRIPTION OF THE PREFERRED EMBODIMENTS

Figure 2:
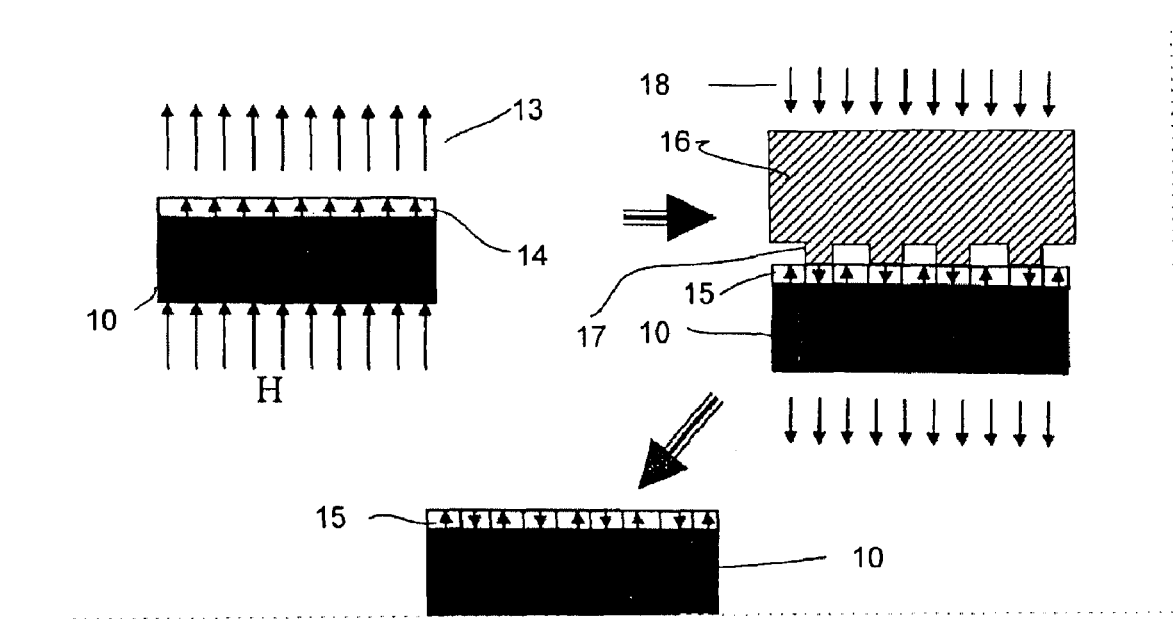
FIG. 2. illustrates a method for recording magnetic marks onto the disk using a high permeability stamper.
Figure 3:
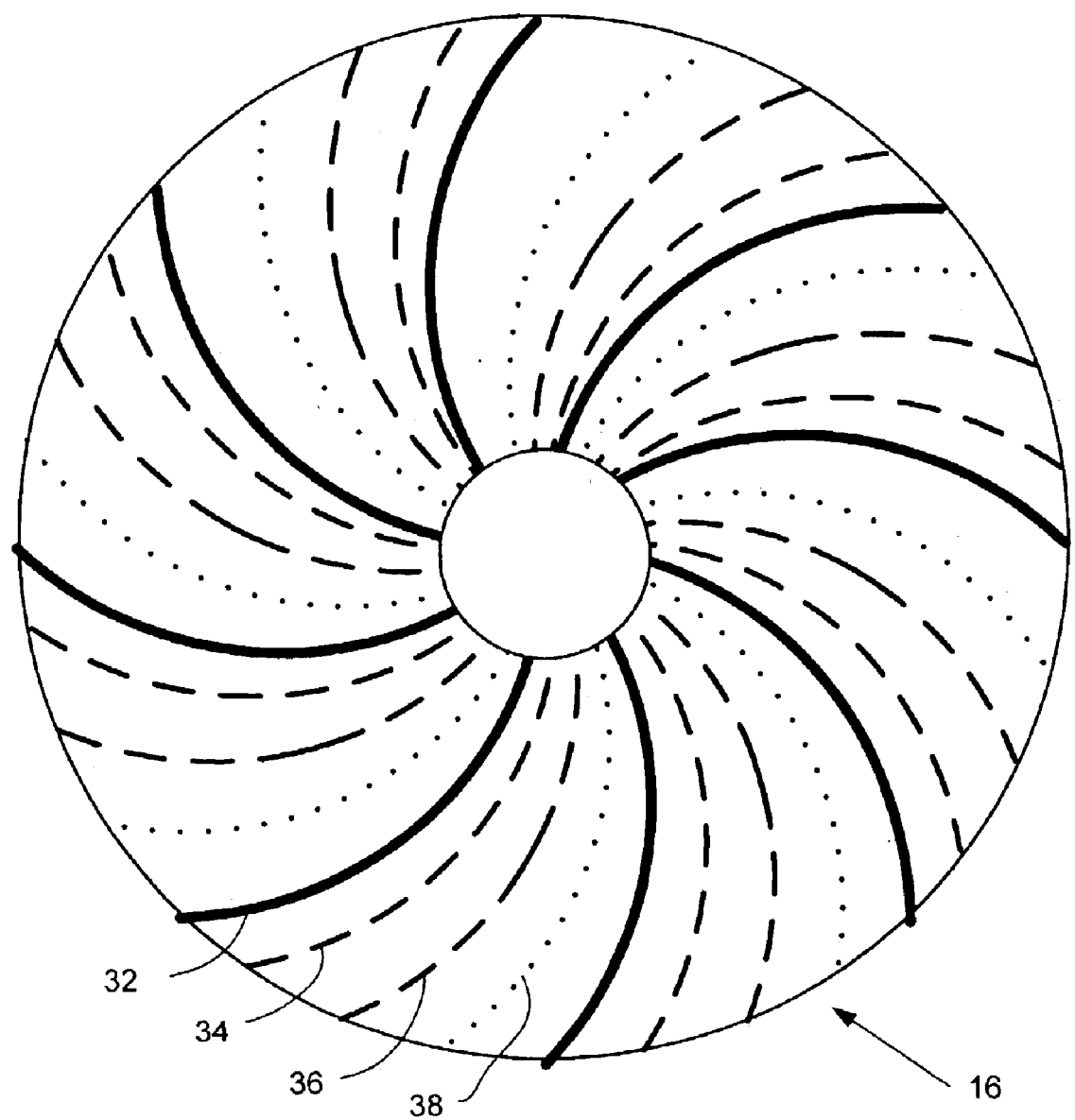
FIG. 3 illustrates a stamper encoded with four of sets of servo data.

FIG. 3 illustrates a stamper 16 that has encoded onto it a plurality of sets of servo data, 32, 34, 36 and 38. Referring briefly to FIG. 2, servo data is encoded on the stamper in the form of raised bosses 17, as described above. Referring back to FIG. 3, each of the servo data sets, for example 32, comprises bursts of servo data in a predetermined pattern angularly spaced from each other by a uniform distance and further aligned radially in the form of arcs extending from substantially the disk's ID to disk's OD. These radially aligned arcs of a given set form a plurality of spokes that are angularly spaced from each other as in the prior art. Servo data set 32, therefore, comprises 8 spokes as illustrated. Each of the other servo data sets 34, 36 and 38 also comprise 8 spokes. Each of the spokes in a set is offset from each other by uniform angle. Each set of servo data in turn is offset from each other sets by a uniform angle.

While the illustrated stamper. 16 comprises four sets of servo data, each set having eight spokes for each set 32, 34, 36 and 38 of servo data, a typical stamper may include hundreds of such spokes for each set depending on the track density of the hard disk as described above.

All of the sets, 32, 34, 36 and 38 may comprise identical servo data patterns. Alternatively, some of the patterns, for example sets 34 and 38, may comprise different servo data patterns. Thus patterns of sets 32 and 36 may be employed in a disk drive that uses such patterns, while patterns of sets 34 and 38 may be used in a different type of disk drive that uses these patterns.

Note that there may be a plurality of sets of servo data for each pattern.

The number of sets of servo data patterns is limited only by the need to provide some minimum angular offset between each set.

Figure 1:
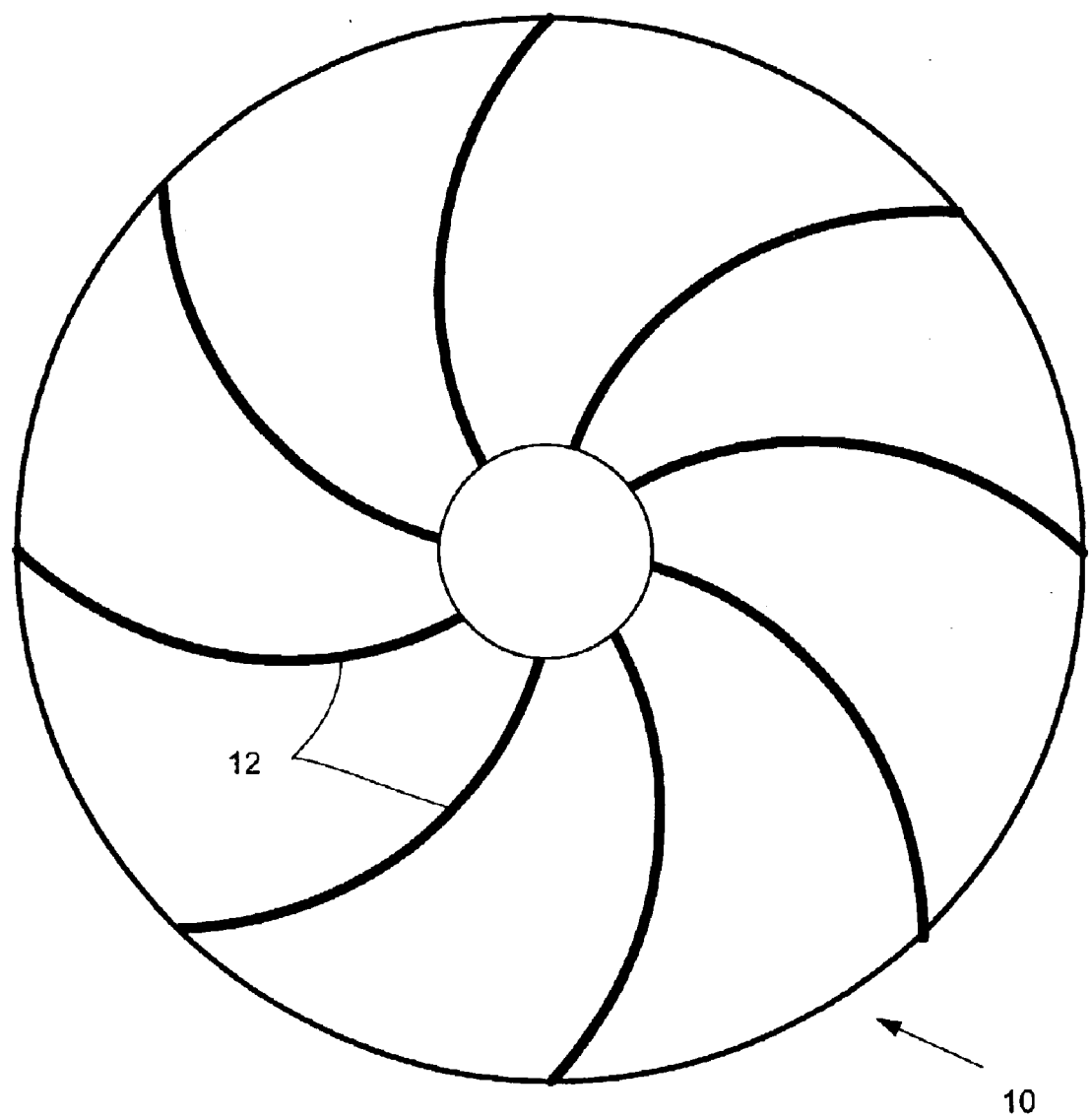
FIG. 1 is an illustration of the arced spoke patterns of servo data on a magnetic hard disk.

The stamper 16 is used in a process as described above in connection with FIG. 1 to encode all of sets of servo data onto the hard disk at the same time. The hard disk is then mounted onto either a spinstand or into a production disk drive. There, one of the servo data sets is selected according to a predetermined criteria and the rest of the sets are either erased or ignored. The servo data set selected may also be marked by encoding a flag recorded in the servo data itself by another distinguishing mark.

The criteria may include a hard disk drive type that would operate in conjunction with means for selecting the appropriate servo data pattern. Primary or secondary criteria may include determining which of the sets meet a minimum quality requirement or which of the sets has the greatest quality above a threshold. The most common criteria used in testing servo data includes a test for total number of errors on the entire disk, the number of errors on a particular track and the number of consecutive errors. The criteria varies from drive to drive. Some drives can tolerate more errors than others.

In one embodiment, the tester or disk drive would conduct tests on respective servo data patterns until the criteria is met. If the first set of servo data tested meet the criteria, further testing could be terminated. The set of servo data selected would then be marked in a fashion readable by the disk drive and the rest of the servo data sets ignored. They will be overwritten when data is recorded.

One method of marking the selected servo data set may however comprise erasing all the other sets. Another method of marking would be to write a flag into the selected set.

While the invention has been described in connection with a stamper 16, the invention may be used with any method of recording servo data on a hard disk, including conventional methods and including other methods of printing servo data onto disks using masking techniques.

Figure 4:
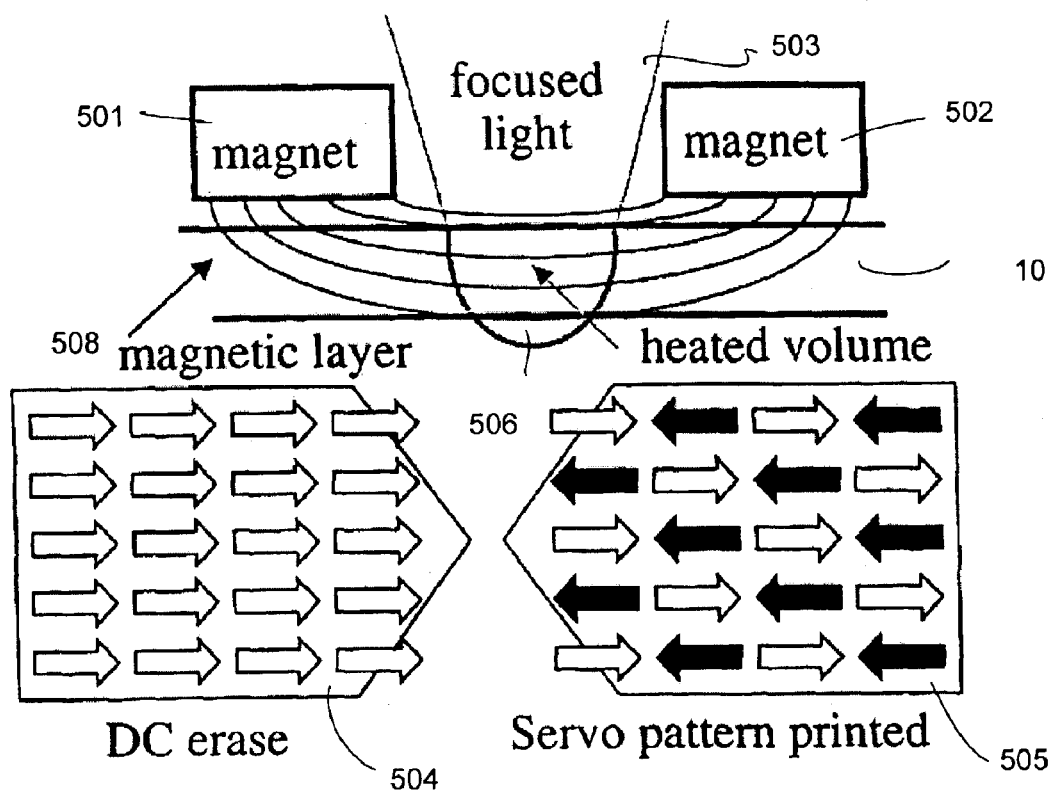
FIG. 4 illustrates a method of photo-printing servo data onto a hard disk using a mask.

FIG. 4 illustrates a photo printing technique for printing servo data onto the hard disk. A pair of electromagnets 501 and 502, are located adjacent the magnetic disk 10 such that when the disk is rotated beneath the magnets the magnetic field from the magnets causes the disk's magnetic layer 508 to magnetize the same direction. As illustrated in box 504, the magnets are first utilized to "DC erase" the disk by causing its magnetization to assume uniform direction. Next a stencil mask (not shown, but represented by the focused light beam 503) is applied to the disk surface. The stencil's openings correspond to the pattern intended to be written. A light source (not shown) then irradiates the disk through the stencil to focus the light on the exposed areas 503. This heats only the areas 506 exposed by the stencil. The heat causes the coercivity the magnetic layer 508 to decrease. At this point, the electromagnets are now turned on, but with their magnetic fields oriented in the opposite direction from the initial DC erase step. However this time, they are operated to generate a lower magnetic field level. This causes only the heated areas 506, which have a lower coercivity, to switch their magnetic directions to be aligned with the reversed magnetic field from magnets 501 and 502. This results in a pattern 505 of disk magnetization that copies the stencil pattern.

Without limiting the generality thereof, the invention encompasses any form of servo data pattern that may be arranged in angularly spaced sets. A plurality of such sets may then be recorded, each set angularly offset from the others until substantially the whole disk surface may be covered with sets of servo data. Each of the sets may comprise identical servo data patterns. Alternatively, subsets may comprise alternative patterns. This enables the same disk to be employed in a number of different disk drive types that employ difference servo data patterns.

Those of ordinary skill in the art may vary the features of the invention without departing from the scope of the invention as claimed in the following claims.

We claim:

1. A method of recording servo information on a magnetic hard disk, comprising:

recording a plurality of sets of servo patterns onto a hard disk, said plurality of sets of servo patterns further comprising at least two of said sets having differing patterns that may be employed by at least two different disk drive types;

determining one of the sets that meets predefined criteria; and based upon such determination, using that set for the disk drive servo.

2. The method according to claim 1 wherein said recording step comprises printing the servo patterns onto the disk.

3. The method according to claim 2 wherein said printing step comprises the use of a tool selected from the group consisting of a stamper or a mask.

4. The method according to claim 1 wherein said criteria comprises determining a set of servo data that meets minimum quality criteria.

5. The method according to claim 1 wherein said criteria comprises determining a set of servo data that most greatly exceeds minimum quality criteria.

6. The method according to claim 1 further including erasing the other sets of servo data.

7. A disk drive servo stamper, comprising;

a plurality of sets of servo patterns, each set offset from other sets by an angle; and wherein at least one subset of said set comprises a pattern different from the other sets; wherein the different pattern may be used by a different disk drive type.

8. Apparatus for recording servo information on a magnetic hard disk, comprising:

means for recording a plurality of sets of servo patterns onto a hard disk drive, said means for recording a plurality of sets of servo patterns further comprising means for recording at least two of said sets with differing patterns that may be employed by at least two different disk drive types;

means for determining one of the sets that meets predefined criteria; and based upon such determination, means for using that set for the disk drive servo.

9. Apparatus according to claim 8 wherein said recording means comprises means for printing the servo patterns onto the disk.

10. Apparatus according to claim 9 wherein said printing means comprises tool means selected from the group consisting of a stamper or a mask.

11. Apparatus according to claim 8 wherein means for determining predefined criteria comprises means for determining a set of servo data that meets minimum quality criteria.

12. Apparatus according to claim 8 wherein means for determining predefined criteria comprises means for determining a set of servo data that most greatly exceeds minimum quality criteria.

13. Apparatus according to claim 8 further including means for erasing the other sets of servo data.

14. A method of recording servo information on a magnetic hard disc comprising recording a plurality of sets of servo data only one of which is used by a hard disk drive; and wherein some of the sets comprise patterns different from other sets in order that the same hard disk may be used in more than one disk drive type.

15. A disk drive servo photo printing mask, comprising:

a plurality of sets of servo patterns, each set offset from other sets by an angle; and wherein at least one subset of said set comprises a pattern different from the other sets; wherein the different pattern may be used by a different disk drive type.

* * * * *